Dec. 24, 1957 W. B. STEIN 2,817,258
TOOL ADJUSTING WRENCH
Filed Sept. 9, 1955
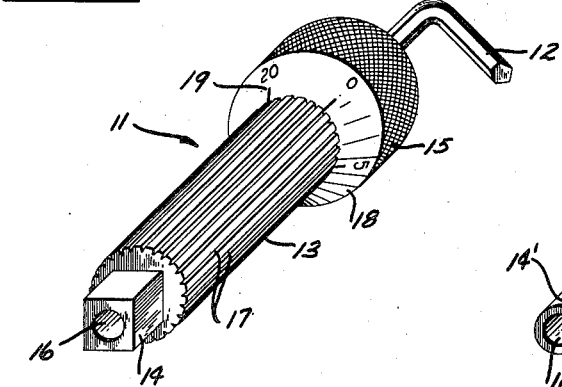
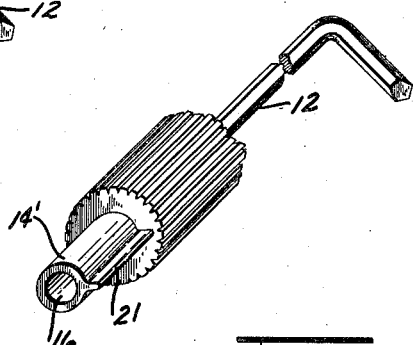
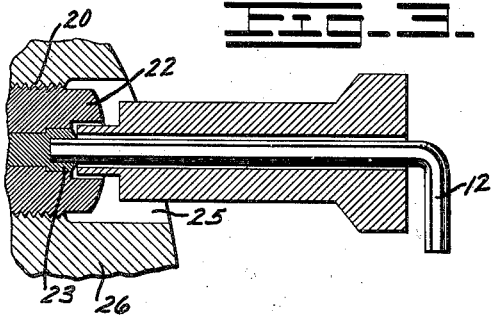
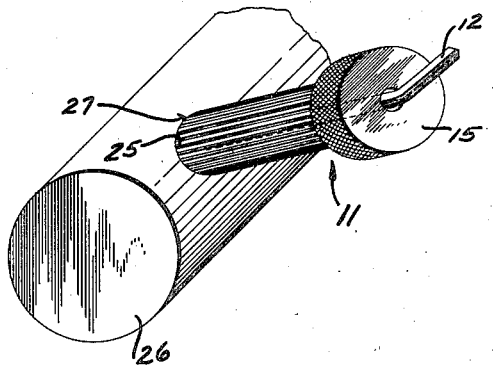
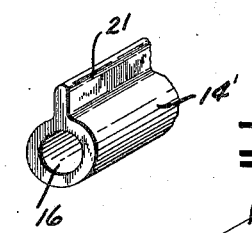
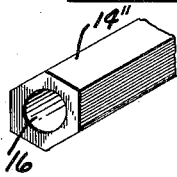
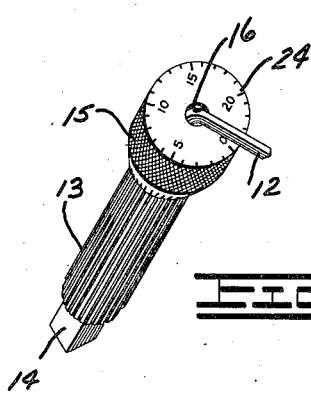
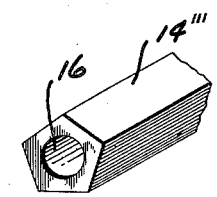
INVENTOR
William B. Stein
BY
Lawrence, Vander Kelen & Miller
ATTORNEY

United States Patent Office 2,817,258
Patented Dec. 24, 1957

2,817,258

TOOL ADJUSTING WRENCH

William B. Stein, Barberton, Ohio

Application September 9, 1955, Serial No. 533,331

2 Claims. (Cl. 81—71)

The present invention relates to a tool for making accurate adjustments of mechanical structures where the access to the adjusting element is recessed and where calibrated indicia on the adjusting elements cannot be read. More particularly the present invention relates to a wrench, insertable in sockets, which can be read directly as to amount of adjustment independently of visual access to the adjustment element itself. The present invention has particular application in the adjustment of machine tools such as boring bars and reference is made to the co-pending application Serial Number 518,311, filed June 27, 1935, for illustration of a specific type of tool adjustment where the present wrench has immediate utility.

As adjustments are made available in machine tools there is an increasing demand that the bulkiness of such adjustments be reduced so that the tools represent neat and compact units in all size ranges. It is desirable, for example, to provide micro adjustments of cutters in boring bars available in small diameters. However, where the bar diameter diminishes, the room for visual observation of adjustment decreases and accuracy of adjustment suffers. Even in the larger bars or tools the adjustments are obscured in recesses so that the clearance limitations of the tool are kept to a minimum. In such instances there is an immediate demand for a means to provide accurate repetitive adjustment where visual control over the amount of adjustment is difficult or impossible. The present tool adjusting wrench answers that demand and in its broadest application makes blind adjustments accurately and easily.

It is thus the principal object of the present invention to provide a device for making rotational controlled adjustment of recessed members.

Another object is to present a calibrated structure which is rugged and durable under hard shop usage and which may be utilized in a variety of applications.

It is a further object of the present invention to provide means for locking adjustable elements while holding a desired adjustment.

It is a further object to provide a structure which is visually indexed to a base structure and which may be read easily and accurately as to the amount of rotational movement imparted to an adjusting element.

Other objects including economy of construction, simplicity, and extreme efficiency in accomplishing rapid and accurate adjustment will become increasingly apparent to those skilled in the art as the description proceeds.

A still further object is to provide an adjusting and locking wrench combination which makes possible the improvement of tools and tool adjustments by minimizing space requirements while enhancing accuracy of adjustment.

In the drawing:

Figure 1 is a perspective view of an adjusting wrench in accord with the present invention showing longitudinal lines mating with numerical calibrations appearing on the barrel portion and showing the keyed pilot extending forwardly of the device.

Figure 2 is a fragmental perspective view of a modified pilot illustrating a wing of metal forming a single key and showing the lock element extending through the axially open barrel element.

Figure 3 is a full section elevation through the adjusting wrench of the present invention showing the device in association with a rotationally adjustable member and showing the locking element engaging a locking portion of an adjusting assembly.

Figure 4 is a perspective view of the adjusting wrench of the present invention inserted in an adjusting recess of a tool with the locking element extending from the handle and illustrating an index mark adjacent the adjusting recess.

Figure 5 is a perspective view of a modified form of the pilot-key as illustrated in Fig. 2.

Figure 6 is a perspective view of another modification of pilot-key.

Figure 7 is a perspective view of a pentagonal pilot-key.

Figure 8 is a perspective view illustrating a modified handle or butt portion wherein a micrometer scale is provided so that the amount of rotational movement of the inner rotational element is visually measurable for use where the inner rotational member accomplishes adjustment and the barrel member serves as a locking element or where two recess headed adjustment elements are adjustable by the same tool.

General description

In general, a tubular barrel member is provided. One end of the barrel member is knurled or otherwise formed for a grip providing easy manual turning. The external cylindrical face of the barrel is provided with serrations or lines running substantially the length of the barrel and paralleling the axis of the barrel. Numerical calibrations are placed on an annular shoulder of the barrel, the calibrations corresponding to selected serrations and arranged for easy reading. At the end of the barrel opposite the grip or handle, a pilot extends axially. An axial opening is provided through the barrel and a locking member is extended therethrough in such a manner as to turn freely in the opening and to extend through and beyond the pilot.

The device in use is inserted in a recess in a base member (Figure 3) until the pilot drops into a mating recessed headed adjusting member, for example. Then the locking member is extended through the pilot to engage a similar recess in a lock element. Upon engagement of the locking member a turn of the locking member loosens the adjustment permitting easy motion of the adjustment and the barrel of the wrench structure, and allows observed adjustment by rotation of the barrel portion. The lines or serrations extend to the recess and readings on the tool are indexed to any suitable mark adjacent the adjustment recess. Where a lock screw is employed the locking member is rotated to lock the held adjustment in position. In some instances, the member accomplishing the adjustment is the inner member of the concentric recess headed elements. In such instances a simple modification as illustrated in Figure 8 permits calibrated rotation of the inner locking member. In the broadest sense it will be understood that the barrel with its graduated lines and index numerals is usable without the locking member for calibrated movement of a simple back-up screw, for example.

Specific description

Referring more specifically to the drawing, a generally tubular barrel member 11 is provided through which is rotatably passed the stem of an L-shaped locking element or key 12. The tubular barrel 11 consists of a cylindrical shank section 13, a pilot element 14, and flange-like cylindrical handling section 15. A bore or opening 16 extends axially through the barrel 11. The cylindrical shank 13 is serrated to form lines or serrations 17 radially disposed at selected spaced intervals around the shank 13. The handling section 15 is knurled peripherally to provide for easy rotation and grip. The handling section 15, being concentric with the shank 13 and of increased diameter, forms a shoulder 18 upon which selected numerical designations 19 are imprinted to provide numerical calibrations corresponding to the radially provided longitudinal serrations 17. The pilot 14 is noncircular in form, corresponding to a recess provided in any selected adjusting element 20. The pilot 14 may assume a variety of styles such as illustrated, for example, in Figures 1, 2, 5, 6 and 7. A preferred form of pilot 14 is provided with a single positioning element or blade 21 and such a pilot-key 14' as best shown in Figures 2 and 5. This latter style of pilot 14' has the advantage of indexing the entire adjusting wrench upon engagement. The noncircular form in the pilot 14 is provided for good rotational gripping and should correspond to the recessed head 22 of any selected adjusting element 20. In Figures 6 and 7, respectively, other modifications of the pilot-key elements are shown as 14" and 14"'.

The locking element 12 consists in its simplest form of a stem and right angle section forming a turning means and is inserted turnably and axially through the bore 16 extending through the barrel 11. When fully inserted, the L-shaped element 12 extends from the pilot 14 to engage a concentrically positioned screw 23, for example, which may be a lock screw. When the adjusting wrench is desired to be used to move the screw 23 adjustably, then the locking element 12 is indexed to radial or dial calibrations 24 provided in the end or butt section of the handle 15 as shown best in Figure 8.

*Operation*

The operation of the tool adjusting wrench is best illustrated in Figures 3 and 4. In Figure 4 a wrench is shown extending into an adjusting recess 25 in a tool body 26. An index mark 27 is shown extending radially from the periphery of the recess 25. The index mark 27 corresponds to a reference line 17 and can be read from the numerical calibrations 19 on shoulder 18. As the barrel 11 is rotated the member 20 engaged with the pilot 14 is rotated and the amount of rotation is visually observed as projection is accomplished using the longitudinal lines 17 and reading from the calibrated scale 19 remotely referenced to the mark 27 on the tool 26. The locking element 12 is similarly rotatable for locking or unlocking an element 23.

Details of the engagement of the tool with a pair of adjusting elements in a typical application is illustrated in the section view of Figure 3. In instances where it is desired to have observed rotational control over the screw adjustment element 23, the calibrations 24 provide a simple visual reading means using the locking element 12 as a suitable remote index.

It will thus be seen that a simple tool adjusting wrench has been provided having immediate application to recessed tool adjustments, with or without associated locking means. The tool makes possible rapid and accurately observed adjustments with remote visual reading.

Having thus described a specific embodiment of my invention it will be understood that numerous modifications well known in the art are intended to be included in the invention, limited only by the scope of the hereinafter appended claims.

I claim:

1. In a tool adjusting wrench having application in recessed openings, the combination including: an enlarged knurled turning handle having an axial opening therethrough; a tubular section turnable with said handle and having longitudinal lines provided circumferentially spaced on its outer surface, said tubular section having its axis coinciding with the axis of said handle; a tubular pilot turnable with said tubular section and having a noncircular outer shape extending from said tubular section and being axially aligned with said tubular section; a set of radial numerical calibrations indexed to said lines on said tubular section and located on said enlarged handle; and an L-shaped lock member having one arm extending axially and turnably through said handle, said tubular section, and said pilot, and extendable beyond said pilot and a second arm of said lock member overlying said handle for accomplishing rotation of said lock member in said handle.

2. In a tool adjusting wrench having application in recessed openings, the combination including: a turning handle having an axial opening therethrough; a tubular section turnable with said handle and having longitudinal lines provided circumferentially spaced on its outer surface, said tubular section having its axis coinciding with the axis of said handle; a tubular pilot turnable with said tubular section and having a noncircular outer shape extending from said tubular section and being axially aligned with said tubular section; a set of radial numerical calibrations on said handle's inner face indexed to said lines on said tubular section; a dial-like set of calibrations arranged peripherally and radially on said handle's outer face; an L-shaped lock member having one arm extending axially and turnably through said handle, said tubular section, and said pilot, and extendable beyond said pilot; and a second arm of said lock member overlying the outer face of the handle whereby the amount of rotation of said lock member can be read directly on said dial-like set of calibrations.

References Cited in the file of this patent

UNITED STATES PATENTS

| | | |
|---|---|---|
| 1,507,362 | Bartosik | Sept. 2, 1924 |
| 1,746,381 | Davis | Feb. 11, 1930 |
| 2,125,005 | Jearum | July 26, 1938 |
| 2,666,350 | Hackett | Jan. 19, 1954 |

FOREIGN PATENTS

| | | |
|---|---|---|
| 1,020,940 | France | Nov. 26, 1952 |